US012513481B2

(12) United States Patent
Mate et al.

(10) Patent No.: US 12,513,481 B2
(45) Date of Patent: Dec. 30, 2025

(54) METHOD AND APPARATUS FOR AUDIO TRANSITION BETWEEN ACOUSTIC ENVIRONMENTS

(71) Applicant: Nokia Technologies Oy, Espoo (FI)

(72) Inventors: Sujeet Shyamsundar Mate, Tampere (FI); Jussi Artturi Leppanen, Tampere (FI); Antti Johannes Eronen, Tampere (FI); Otto Viljami Harju, Tampere (FI)

(73) Assignee: Nokia Technologies Oy, Espoo (FI)

( * ) Notice: Subject to any disclaimer, the term of this patent is extended or adjusted under 35 U.S.C. 154(b) by 99 days.

(21) Appl. No.: 17/973,615

(22) Filed: Oct. 26, 2022

(65) Prior Publication Data

US 2023/0133555 A1 May 4, 2023

(30) Foreign Application Priority Data

Oct. 28, 2021 (GB) ..................................... 2115533

(51) Int. Cl.
*H04S 7/00* (2006.01)

(52) U.S. Cl.
CPC .............. *H04S 7/302* (2013.01); *H04S 7/305* (2013.01)

(58) Field of Classification Search
CPC ................................. H04S 7/302; H04S 7/305
See application file for complete search history.

(56) References Cited

U.S. PATENT DOCUMENTS

2019/0116448 A1* 4/2019 Schmidt .................. H04S 3/008
2021/0092546 A1* 3/2021 Terentiv .................. H04S 7/303
2022/0377485 A1* 11/2022 Raghuvanshi .......... H04S 7/303
2023/0051586 A1* 2/2023 Mindlin .................. H04S 7/304
2023/0262405 A1* 8/2023 Falk ........................ H04S 7/303 381/303

FOREIGN PATENT DOCUMENTS

EP 3506082 A1 7/2019
WO WO 2020/144061 A1 7/2020
WO WO 2021/067555 A1 4/2021
WO WO 2021/186102 A1 9/2021

OTHER PUBLICATIONS

Wefers et al., "Real-Time Auralization of Coupled Rooms", Jun. 2009, Proceedings of the EAA auralization symposium, Espoo, Finland, pp. 1-6. (Year: 2009).*

* cited by examiner

*Primary Examiner* — Daniel R Sellers
(74) *Attorney, Agent, or Firm* — McCarter & English, LLP

(57) ABSTRACT

An apparatus for enabling audio transition between at least two acoustic environments, the apparatus including circuitry configured to: obtain information of at least a first acoustic environment associated with an audio scene, wherein the audio scene includes the first acoustic environment and a second acoustic environment; obtain a first distance threshold that at least partially defines an audio transition region that enables adaptive rendering between the first and second acoustic environments depending on a listening position within the audio scene; determine the listening position to adjust an environment characteristic of at least one of the first and second acoustic environments; and adjust the environment characteristic of at least one of the first and second acoustic environments depending on the listening position, wherein the environment characteristic is adaptively controlled within the audio scene.

20 Claims, 10 Drawing Sheets

METHOD AND APPARATUS FOR AUDIO TRANSITION BETWEEN ACOUSTIC ENVIRONMENTS

FIELD

The present application relates to method and apparatus for late reverberation cross fade implementation between acoustic environments in an immersive audio scene, but not exclusively for method and apparatus for late reverberation cross fade implementation between acoustic environments in an immersive audio scene for 6 degrees-of-freedom rendering.

BACKGROUND

Augmented Reality (AR) applications (and other similar virtual scene creation applications such as Mixed Reality (MR) and Virtual Reality (VR)) where a virtual scene is represented to a user wearing a head mounted device (HMD) have become more complex and sophisticated over time. The application may comprise data which comprises a visual component (or overlay) and an audio component (or overlay) which is presented to the user. These components may be provided to the user dependent on the position and orientation of the user (for a 6 degree-of-freedom application) within an Augmented Reality (AR) scene.

Scene information for rendering an AR scene typically comprises two parts. One part is the virtual scene information which may be described during content creation (or by a suitable capture apparatus or device) and represents the scene as captured (or initially generated). The virtual scene may be provided in an encoder input format (EIF) data format. The EIF and (captured or generated) audio data is used by an encoder to generate the scene description and spatial audio metadata (and encoded audio signals), which can be delivered via the bitstream to the rendering (playback) device or apparatus. The EIF is described in MPEG-I 6DoF audio encoder input format developed for the call for proposals (CfP) on MPEG-I 6DoF Audio in the ISO/IEC JTC1 SC29 WG6 MPEG Audio coding. The implementation primarily is described in accordance with this specification but can also use other scene description formats that may be provided or used by the scene/content creator.

As per the EIF, the encoder input data contains information describing an MPEG-I 6DoF Audio scene. This covers all contents of the virtual auditory scene, i.e. all of its sound sources, and resource data, such as audio waveforms, source radiation patterns, information on the acoustic environment, etc. The content can thus contain both audio producing elements such as objects, channels, and higher order Ambisonics along with their metadata such as position and orientation and source directivity pattern, and non-audio producing elements such as scene geometry and material properties which are acoustically relevant. The input data also allows to describe changes in the scene. These changes, referred to as updates, can either happen at distinct times, allowing scenes to be animated (e.g. moving objects). Alternatively, they can be triggered manually or by a condition (e.g. listener enters proximity) or be dynamically updated from an external entity".

The EIF information thus defines the created or captured acoustic environment. This in some situations can be modelled as a series of acoustically coupled (i.e. connection to allow transmission of audio) acoustic environments. Thus, in addition to the acoustic environments for specifying reverberation properties, acoustically coupled spaces require the concept of "portals" to make the overall rendering realistic. An acoustic portal has the function of rendering a reverb from a neighbouring room. The portal can be modelled or rendered as a sound source in particular acoustic environment with audio fed from reverberation of the neighboring acoustic environment.

SUMMARY

There is provided according to a first aspect an apparatus for enabling audio transition between at least two acoustic environments, the apparatus comprising means configured to: obtain information of at least a first acoustic environment associated with an audio scene, wherein the audio scene comprises the first acoustic environment and a second acoustic environment; obtain a first distance threshold that at least partially defines an audio transition region that enables adaptive rendering between the first and second acoustic environments depending on a listening position within the audio scene; determine the listening position to adjust an environment characteristic of at least one of the first and second acoustic environments; and adjust the environment characteristic of at least one of the first and second acoustic environments depending on the listening position, wherein the environment characteristic is adaptively controlled within the audio scene.

The means configured to obtain information of at least a first acoustic environment associated with an audio scene, wherein the audio scene comprises the first acoustic environment and a second acoustic environment may be configured to receive a bitstream comprising the information of at least the first acoustic environment associated with the audio scene.

The bitstream may further comprise the first distance threshold, wherein the means configured to obtain the first distance threshold may be configured to obtain the first distance threshold from the bitstream.

The first acoustic environment and the second acoustic environment may be coupled by a first acoustic coupling located at a boundary between the first acoustic environment and the second acoustic environment.

The first distance threshold that at least partially defines the audio transition region may be located within the first acoustic environment and associated with the second acoustic environment.

The means configured to adjust the environment characteristic of at least one of the first and second acoustic environments depending on the listening position may be configured to: determine the listener position is within the audio transition region; and adjust at least one of a first reverberation gain parameter of the first acoustic environment or a second reverberation gain parameter of the second acoustic environment based on the listening position relative to the first distance threshold and the boundary between the first acoustic environment and the second acoustic environment.

The means may be further configured to obtain a first function associated with the first distance threshold, wherein the means configured to adjust the environment characteristic of at least one of the first and second acoustic environments depending on the listening position may be configured to adjust at least one of a first reverberation gain parameter of the first acoustic environment or a second reverberation gain parameter of the second acoustic environment further based on the first function applied to the listening position relative to the first distance threshold and the boundary between the first acoustic environment and the second acoustic environment.

The means may be further configured to render a spatial audio signal, wherein the spatial audio signal may comprise in at least part from a reverberation generated based on the environment characteristic of the at least one of the first and second acoustic environments.

The means configured to render the spatial audio signal may be configured to generate the spatial audio signal comprising a first reverberation part based on the first reverberation gain parameter of the first acoustic environment and/or a second reverberation part based on the second reverberation gain parameter of the second acoustic environment.

The means configured to generate the spatial audio signal comprising a first reverberation part based on the first reverberation gain parameter of the first acoustic environment and/or a second reverberation part based on the second reverberation gain parameter of the second acoustic environment may be configured to: set a current acoustic environment as the first acoustic environment when the listener position is within the first acoustic environment; set reverberation attenuation for all other acoustic environments aside from the first acoustic environment to provide no contribution; set reverberation attenuation to provide a defined contribution for the second acoustic environment where the listener position is within the region within the first acoustic environment defined by the threshold; determine reverberation contributions for the current acoustic environment and other acoustic environments; and combine the reverberation contributions to form part of the spatial audio signal.

The means configured to set reverberation attenuation to provide the defined contribution for the second acoustic environment where the listener position is within the region within the first acoustic environment defined by the threshold may be configured to set the reverberation attenuation to provide the defined contribution for the second acoustic environment based on the first function.

The means configured to obtain a first distance threshold that at least partially defines an audio transition region that enables adaptive rendering between the first and second acoustic environments depending on a listening position within the audio scene may be configured to obtain at least one of: information indicating how many acoustic environments the first distance threshold is applicable to; information indicating to which acoustic environments the first distance threshold is applicable to; information indicating which acoustic environment the first distance threshold is located; information indicating a distance value for the first distance threshold; information indicating a shape or profiles associated with the first distance threshold; information indicating an hysteresis offset value which defines a hysteresis region; information indicating an attenuation modulation type which defines the function for modifying an attenuation level when the listener position moves from outside the first distance threshold to a boundary between the first and second acoustic environments; information indicating a hop which defines a number of hops to a destination acoustic environment from a current acoustic environment; and information indicating a parameter attenuation upperbound limit which defines a maximum attenuation level.

According to a second aspect there is provided an apparatus for generating acoustic environment information to assist rendering an audio scene, the apparatus comprising means configured to: obtain information of at least a first acoustic environment associated with the audio scene, wherein the audio scene comprises the first acoustic environment and a second environment; obtain a first distance threshold that at least partially defines an audio transition region that enables adaptive rendering between the first and second acoustic environments depending on a listening position within the audio scene; encode and output the information and first distance threshold.

The means may be further configured to obtain a first function associated with the first distance threshold, wherein the first function defines an adjustment of an environment characteristic of at least one of the first and second acoustic environments.

The means configured to obtain the first distance threshold that at least partially defines an audio transition region that enables adaptive rendering between the first and second acoustic environments depending on a listening position within the audio scene may be configured to obtain at least one of: information indicating how many acoustic environments the first distance threshold is applicable to; information indicating to which acoustic environments the first distance threshold is applicable to; information indicating which acoustic environment the first distance threshold is located; information indicating a distance value for the first distance threshold; information indicating a shape or profiles associated with the first distance threshold; information indicating an hysteresis offset value which defines a hysteresis region; information indicating an attenuation modulation type which defines the function for modifying an attenuation level when the listener position moves from outside the first distance threshold to a boundary between the first and second acoustic environments; information indicating a hop which defines a number of hops to a destination acoustic environment from a current acoustic environment; and information indicating a parameter attenuation upperbound limit which defines a maximum attenuation level.

The means configured to encode and output the information may be configured to generate a bitstream comprising an encoded information and first distance threshold. The means may be further configured to obtain at least one audio signal associated with the audio scene, and wherein the means configured to encode and output the information is configured to generate the bitstream comprising an encoded at least one audio signal.

According to a third aspect there is provided a method for apparatus for enabling audio transition between at least two acoustic environments, the method comprising: obtaining information of at least a first acoustic environment associated with an audio scene, wherein the audio scene comprises the first acoustic environment and a second acoustic environment; obtaining a first distance threshold that at least partially defines an audio transition region that enables adaptive rendering between the first and second acoustic environments depending on a listening position within the audio scene; determining the listening position to adjust an environment characteristic of at least one of the first and second acoustic environments; and adjusting the environment characteristic of at least one of the first and second acoustic environments depending on the listening position, wherein the environment characteristic is adaptively controlled within the audio scene.

Obtaining information of at least a first acoustic environment associated with an audio scene, wherein the audio scene comprises the first acoustic environment and a second acoustic environment may comprise receiving a bitstream comprising the information of at least the first acoustic environment associated with the audio scene.

The bitstream may further comprise the first distance threshold, wherein obtaining the first distance threshold may comprise obtaining the first distance threshold from the bitstream.

The first acoustic environment and the second acoustic environment may be coupled by a first acoustic coupling located at a boundary between the first acoustic environment and the second acoustic environment.

The first distance threshold that at least partially defines the audio transition region may be located within the first acoustic environment and associated with the second acoustic environment.

Adjusting the environment characteristic of at least one of the first and second acoustic environments depending on the listening position may comprise: determining the listener position is within the audio transition region; and adjusting at least one of a first reverberation gain parameter of the first acoustic environment or a second reverberation gain parameter of the second acoustic environment based on the listening position relative to the first distance threshold and the boundary between the first acoustic environment and the second acoustic environment.

The method may further comprise obtaining a first function associated with the first distance threshold, wherein adjusting the environment characteristic of at least one of the first and second acoustic environments depending on the listening position may comprise adjusting at least one of a first reverberation gain parameter of the first acoustic environment or a second reverberation gain parameter of the second acoustic environment further based on the first function applied to the listening position relative to the first distance threshold and the boundary between the first acoustic environment and the second acoustic environment.

The method may further comprise rendering a spatial audio signal, wherein the spatial audio signal may comprise in at least part from a reverberation generated based on the environment characteristic of the at least one of the first and second acoustic environments.

Rendering the spatial audio signal may comprise generating the spatial audio signal comprising a first reverberation part based on the first reverberation gain parameter of the first acoustic environment and/or a second reverberation part based on the second reverberation gain parameter of the second acoustic environment.

Generating the spatial audio signal comprising a first reverberation part based on the first reverberation gain parameter of the first acoustic environment and/or a second reverberation part based on the second reverberation gain parameter of the second acoustic environment may comprise: setting a current acoustic environment as the first acoustic environment when the listener position is within the first acoustic environment; setting reverberation attenuation for all other acoustic environments aside from the first acoustic environment to provide no contribution; setting reverberation attenuation to provide a defined contribution for the second acoustic environment where the listener position is within the region within the first acoustic environment defined by the threshold; determine reverberation contributions for the current acoustic environment and other acoustic environments; and combining the reverberation contributions to form part of the spatial audio signal.

Setting reverberation attenuation to provide the defined contribution for the second acoustic environment where the listener position is within the region within the first acoustic environment defined by the threshold may comprise setting the reverberation attenuation to provide the defined contribution for the second acoustic environment based on the first function.

Obtaining a first distance threshold that at least partially defines an audio transition region that enables adaptive rendering between the first and second acoustic environments depending on a listening position within the audio scene may comprise obtaining at least one of: information indicating how many acoustic environments the first distance threshold is applicable to; information indicating to which acoustic environments the first distance threshold is applicable to; information indicating which acoustic environment the first distance threshold is located; information indicating a distance value for the first distance threshold; information indicating a shape or profiles associated with the first distance threshold; information indicating an hysteresis offset value which defines a hysteresis region; information indicating an attenuation modulation type which defines the function for modifying an attenuation level when the listener position moves from outside the first distance threshold to a boundary between the first and second acoustic environments; information indicating a hop which defines a number of hops to a destination acoustic environment from a current acoustic environment; and information indicating a parameter attenuation upperbound limit which defines a maximum attenuation level.

According to a fourth aspect there is provided a method for an apparatus for generating acoustic environment information to assist rendering an audio scene, the method comprising: obtaining information of at least a first acoustic environment associated with the audio scene, wherein the audio scene comprises the first acoustic environment and a second environment; obtaining a first distance threshold that at least partially defines an audio transition region that enables adaptive rendering between the first and second acoustic environments depending on a listening position within the audio scene; encoding and outputting the information and first distance threshold.

The method may further comprise obtaining a first function associated with the first distance threshold, wherein the first function defines an adjustment of an environment characteristic of at least one of the first and second acoustic environments.

Obtaining the first distance threshold that at least partially defines an audio transition region that enables adaptive rendering between the first and second acoustic environments depending on a listening position within the audio scene may comprise obtaining at least one of: information indicating how many acoustic environments the first distance threshold is applicable to; information indicating to which acoustic environments the first distance threshold is applicable to; information indicating which acoustic environment the first distance threshold is located; information indicating a distance value for the first distance threshold; information indicating a shape or profiles associated with the first distance threshold; information indicating an hysteresis offset value which defines a hysteresis region; information indicating an attenuation modulation type which defines the function for modifying an attenuation level when the listener position moves from outside the first distance threshold to a boundary between the first and second acoustic environments; information indicating a hop which defines a number of hops to a destination acoustic environment from a current acoustic environment and information indicating a parameter attenuation upperbound limit which defines a maximum attenuation level.

Encoding and outputting the information may comprise generating a bitstream comprising an encoded information and first distance threshold.

The method may further comprise obtaining at least one audio signal associated with the audio scene, and wherein encoding and outputting the information may comprise generating the bitstream comprising an encoded at least one audio signal.

According to a fifth aspect there is provided an apparatus comprising at least one processor and at least one memory including a computer program code, the at least one memory and the computer program code configured to, with the at least one processor, cause the apparatus at least to: obtain information of at least a first acoustic environment associated with an audio scene, wherein the audio scene comprises the first acoustic environment and a second acoustic environment; obtain a first distance threshold that at least partially defines an audio transition region that enables adaptive rendering between the first and second acoustic environments depending on a listening position within the audio scene; determine the listening position to adjust an environment characteristic of at least one of the first and second acoustic environments; and adjust the environment characteristic of at least one of the first and second acoustic environments depending on the listening position, wherein the environment characteristic is adaptively controlled within the audio scene.

The apparatus caused to obtain information of at least a first acoustic environment associated with an audio scene, wherein the audio scene comprises the first acoustic environment and a second acoustic environment may be caused to receive a bitstream comprising the information of at least the first acoustic environment associated with the audio scene.

The bitstream may further comprise the first distance threshold, wherein the means configured to obtain the first distance threshold may be configured to obtain the first distance threshold from the bitstream.

The first acoustic environment and the second acoustic environment may be coupled by a first acoustic coupling located at a boundary between the first acoustic environment and the second acoustic environment.

The first distance threshold that at least partially defines the audio transition region may be located within the first acoustic environment and associated with the second acoustic environment.

The apparatus caused to adjust the environment characteristic of at least one of the first and second acoustic environments depending on the listening position may be caused to: determine the listener position is within the audio transition region; and adjust at least one of a first reverberation gain parameter of the first acoustic environment or a second reverberation gain parameter of the second acoustic environment based on the listening position relative to the first distance threshold and the boundary between the first acoustic environment and the second acoustic environment.

The apparatus may be further caused to obtain a first function associated with the first distance threshold, wherein the apparatus caused to adjust the environment characteristic of at least one of the first and second acoustic environments depending on the listening position may be caused to adjust at least one of a first reverberation gain parameter of the first acoustic environment or a second reverberation gain parameter of the second acoustic environment further based on the first function applied to the listening position relative to the first distance threshold and the boundary between the first acoustic environment and the second acoustic environment.

The apparatus may be caused to render a spatial audio signal, wherein the spatial audio signal may comprise in at least part from a reverberation generated based on the environment characteristic of the at least one of the first and second acoustic environments.

The apparatus caused to render the spatial audio signal may be caused to generate the spatial audio signal comprising a first reverberation part based on the first reverberation gain parameter of the first acoustic environment and/or a second reverberation part based on the second reverberation gain parameter of the second acoustic environment.

The apparatus caused to generate the spatial audio signal comprising a first reverberation part based on the first reverberation gain parameter of the first acoustic environment and/or a second reverberation part based on the second reverberation gain parameter of the second acoustic environment may be caused to: set a current acoustic environment as the first acoustic environment when the listener position is within the first acoustic environment; set reverberation attenuation for all other acoustic environments aside from the first acoustic environment to provide no contribution; set reverberation attenuation to provide a defined contribution for the second acoustic environment where the listener position is within the region within the first acoustic environment defined by the threshold; determine reverberation contributions for the current acoustic environment and other acoustic environments; and combine the reverberation contributions to form part of the spatial audio signal.

The apparatus caused to set reverberation attenuation to provide the defined contribution for the second acoustic environment where the listener position is within the region within the first acoustic environment defined by the threshold may be caused to set the reverberation attenuation to provide the defined contribution for the second acoustic environment based on the first function.

The apparatus caused to obtain a first distance threshold that at least partially defines an audio transition region that enables adaptive rendering between the first and second acoustic environments depending on a listening position within the audio scene may be caused to obtain at least one of: information indicating how many acoustic environments the first distance threshold is applicable to; information indicating to which acoustic environments the first distance threshold is applicable to; information indicating which acoustic environment the first distance threshold is located; information indicating a distance value for the first distance threshold; information indicating a shape or profiles associated with the first distance threshold; information indicating an hysteresis offset value which defines a hysteresis region; information indicating an attenuation modulation type which defines the function for modifying an attenuation level when the listener position moves from outside the first distance threshold to a boundary between the first and second acoustic environments; information indicating a hop which defines a number of hops to a destination acoustic environment from a current acoustic environment and information indicating a parameter attenuation upperbound limit which defines a maximum attenuation level.

According to a sixth aspect there is provided an apparatus comprising at least one processor and at least one memory including a computer program code, the at least one memory and the computer program code configured to, with the at least one processor, cause the apparatus at least to: obtain information of at least a first acoustic environment associated with the audio scene, wherein the audio scene comprises the first acoustic environment and a second environment; obtain a first distance threshold that at least partially defines an audio transition region that enables adaptive rendering between the first and second acoustic environments depending on a listening position within the audio scene; encode and output the information and first distance threshold.

The apparatus may be further caused to obtain a first function associated with the first distance threshold, wherein the first function defines an adjustment of an environment characteristic of at least one of the first and second acoustic environments.

The apparatus caused to obtain the first distance threshold that at least partially defines an audio transition region that enables adaptive rendering between the first and second acoustic environments depending on a listening position within the audio scene may be caused to obtain at least one of: information indicating how many acoustic environments the first distance threshold is applicable to; information indicating to which acoustic environments the first distance threshold is applicable to; information indicating which acoustic environment the first distance threshold is located; information indicating a distance value for the first distance threshold; information indicating a shape or profiles associated with the first distance threshold; information indicating an hysteresis offset value which defines a hysteresis region; information indicating an attenuation modulation type which defines the function for modifying an attenuation level when the listener position moves from outside the first distance threshold to a boundary between the first and second acoustic environments; information indicating a hop which defines a number of hops to a destination acoustic environment from a current acoustic environment; and information indicating a parameter attenuation upperbound limit which defines a maximum attenuation level.

The apparatus caused to encode and output the information may be caused to generate a bitstream comprising an encoded information and first distance threshold.

The apparatus may be further caused to obtain at least one audio signal associated with the audio scene, and wherein the apparatus caused to encode and output the information may be caused to generate the bitstream comprising an encoded at least one audio signal.

According to a seventh aspect there is provided an apparatus comprising: means for obtaining information of at least a first acoustic environment associated with an audio scene, wherein the audio scene comprises the first acoustic environment and a second acoustic environment; means for obtaining a first distance threshold that at least partially defines an audio transition region that enables adaptive rendering between the first and second acoustic environments depending on a listening position within the audio scene; means for determining the listening position to adjust an environment characteristic of at least one of the first and second acoustic environments; and means for adjusting the environment characteristic of at least one of the first and second acoustic environments depending on the listening position, wherein the environment characteristic is adaptively controlled within the audio scene.

According to an eighth aspect there is provided an apparatus comprising: means for obtaining information of at least a first acoustic environment associated with the audio scene, wherein the audio scene comprises the first acoustic environment and a second environment; means for obtaining a first distance threshold that at least partially defines an audio transition region that enables adaptive rendering between the first and second acoustic environments depending on a listening position within the audio scene; and means for encoding and outputting the information and first distance threshold.

According to a ninth aspect there is provided a computer program comprising instructions [or a computer readable medium comprising program instructions] for causing an apparatus to perform at least the following: obtain information of at least a first acoustic environment associated with an audio scene, wherein the audio scene comprises the first acoustic environment and a second acoustic environment; obtain a first distance threshold that at least partially defines an audio transition region that enables adaptive rendering between the first and second acoustic environments depending on a listening position within the audio scene; determine the listening position to adjust an environment characteristic of at least one of the first and second acoustic environments; and adjust the environment characteristic of at least one of the first and second acoustic environments depending on the listening position, wherein the environment characteristic is adaptively controlled within the audio scene.

According to a tenth aspect there is provided a computer program comprising instructions [or a computer readable medium comprising program instructions] for causing an apparatus to perform at least the following: obtain information of at least a first acoustic environment associated with the audio scene, wherein the audio scene comprises the first acoustic environment and a second environment; obtain a first distance threshold that at least partially defines an audio transition region that enables adaptive rendering between the first and second acoustic environments depending on a listening position within the audio scene; encode and output the information and first distance threshold.

According to an eleventh aspect there is provided a non-transitory computer readable medium comprising program instructions for causing an apparatus to perform at least the following: obtain information of at least a first acoustic environment associated with an audio scene, wherein the audio scene comprises the first acoustic environment and a second acoustic environment; obtain a first distance threshold that at least partially defines an audio transition region that enables adaptive rendering between the first and second acoustic environments depending on a listening position within the audio scene; determine the listening position to adjust an environment characteristic of at least one of the first and second acoustic environments; and adjust the environment characteristic of at least one of the first and second acoustic environments depending on the listening position, wherein the environment characteristic is adaptively controlled within the audio scene.

According to a twelfth aspect there is provided a non-transitory computer readable medium comprising program instructions for causing an apparatus to perform at least the following: obtain information of at least a first acoustic environment associated with the audio scene, wherein the audio scene comprises the first acoustic environment and a second environment; obtain a first distance threshold that at least partially defines an audio transition region that enables adaptive rendering between the first and second acoustic environments depending on a listening position within the audio scene; encode and output the information and first distance threshold.

According to a thirteenth aspect there is provided an apparatus comprising: obtaining circuitry configured to obtain information of at least a first acoustic environment associated with an audio scene, wherein the audio scene comprises the first acoustic environment and a second acoustic environment; obtaining circuitry configured to obtain a first distance threshold that at least partially defines an audio transition region that enables adaptive rendering between the first and second acoustic environments depending on a listening position within the audio scene; determining circuitry configured to determine the listening position to adjust an environment characteristic of at least one of the first and second acoustic environments; and adjusting circuitry configured to adjust the environment characteristic of at least one of the first and second acoustic environments depending on the listening position, wherein the environment characteristic is adaptively controlled within the audio scene.

According to a fourteenth aspect there is provided an apparatus comprising: obtaining circuitry configured to obtain information of at least a first acoustic environment associated with the audio scene, wherein the audio scene comprises the first acoustic environment and a second environment; obtaining circuitry configured to obtain a first distance threshold that at least partially defines an audio transition region that enables adaptive rendering between the first and second acoustic environments depending on a listening position within the audio scene; encoding and outputting circuitry configured to encode and output the information and first distance threshold.

According to a fifteenth aspect there is provided a computer readable medium comprising program instructions for causing an apparatus to perform at least the following: obtain information of at least a first acoustic environment associated with an audio scene, wherein the audio scene comprises the first acoustic environment and a second acoustic environment; obtain a first distance threshold that at least partially defines an audio transition region that enables adaptive rendering between the first and second acoustic environments depending on a listening position within the audio scene; determine the listening position to adjust an environment characteristic of at least one of the first and second acoustic environments; and adjust the environment characteristic of at least one of the first and second acoustic environments depending on the listening position, wherein the environment characteristic is adaptively controlled within the audio scene.

According to a sixteenth aspect there is provided a computer readable medium comprising program instructions for causing an apparatus to perform at least the following: obtain information of at least a first acoustic environment associated with the audio scene, wherein the audio scene comprises the first acoustic environment and a second environment; obtain a first distance threshold that at least partially defines an audio transition region that enables adaptive rendering between the first and second acoustic environments depending on a listening position within the audio scene; encode and output the information and first distance threshold.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
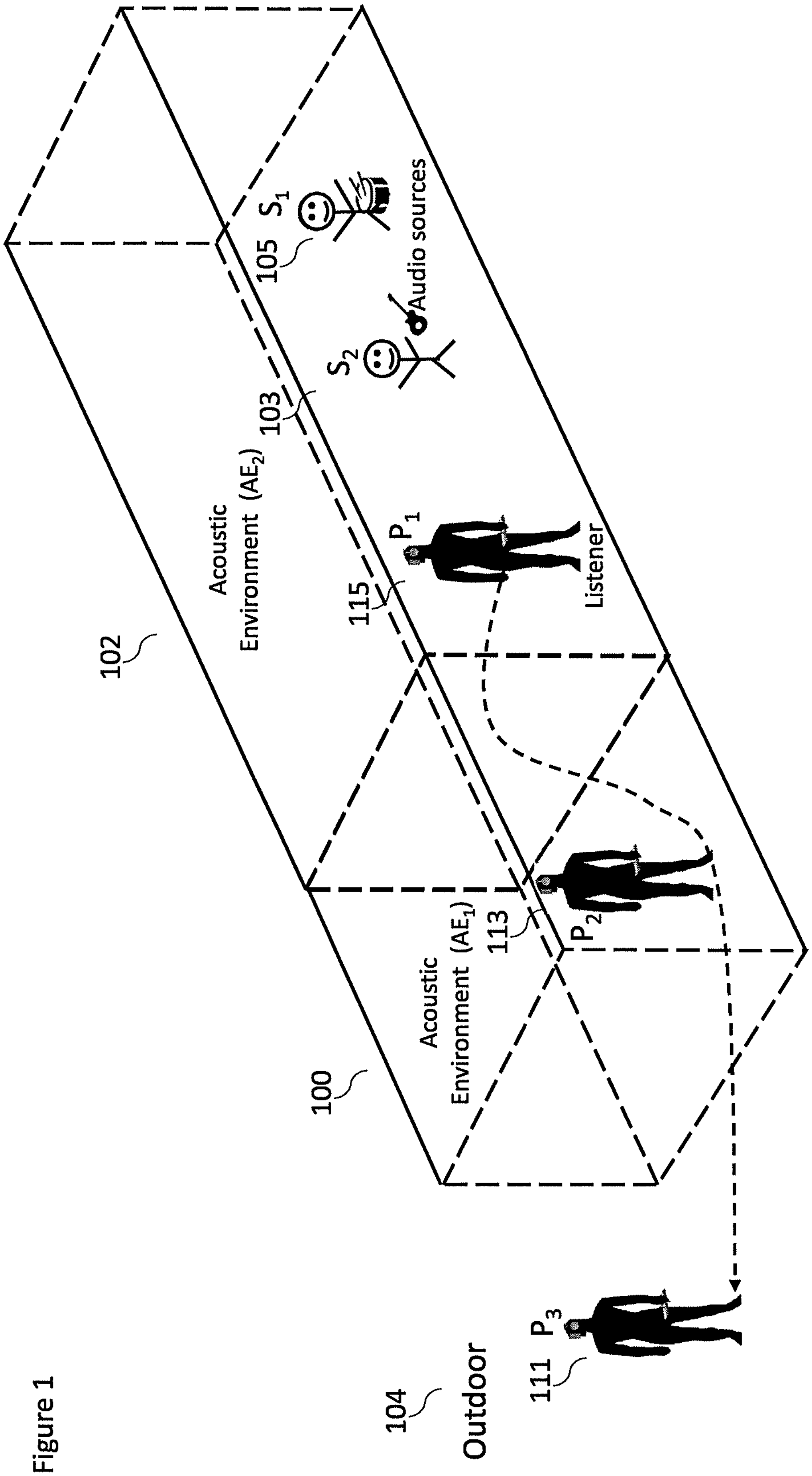
FIG. 1 shows schematically an example of multiple acoustic environments where within which there can be implemented some embodiments.

As described above a created or captured audio scene can be modelled as a series of acoustic environments. For each acoustic environment, there can be moddled a separate configured reverberator (for example, with 15 uncorrelated outputs from output taps of the delay lines modelling the reverberation) with properties which are in accordance with the properties specified for each of the individual acoustic environments.

The concept which is discussed in the embodiments herein is one in which there is provided apparatus and methods enabling the seamless transition between two or more acoustic environments. The modelling of the reverberation for each acoustic environment can be performed differently for each acoustic environment depending on the acoustic properties, for example the physical size of the environment.

Consequently, a renderer can configure the reverberation filter for each acoustic environment individually and which creates a different diffuse late reverberation modelling in the different acoustic environments.

Such modelling approach though creates an abrupt change when a listener moves across a boundary between two acoustic environments. Such an abrupt change and clear difference in the diffuse late reverberation for each of acoustic environments will produce an effect which will be unnatural, distracting and break the immersive experience. This break is because a plausible real world experience or perception when moving from one acoustic environment to the other one is not typically as drastic. For example, when moving between a hall and a corridor the audio does not change abruptly so as to be perceived as disturbing.

Thus in the embodiments as described herein is apparatus and methods to enable smooth and seamless transitions which make the listening experience more believable.

Although diffuse late reverberation is inherently agnostic to the listener position in an acoustic environment in some embodiments the resultant reverberation rendering is modified in special circumstances (such as near or at the boundary between the acoustic environments) in order to make it more believable.

In some embodiments the apparatus and methods thus relate to obtaining seamless transition between acoustic environments (AEs) where there is provided a mechanism for modifying the late reverberation in the first AE depending on the listener position proximity to the second acoustically coupled AE which is performed in such a way to achieve a resultant late reverb rendering that has a perceptually seamless transition between the two acoustic environments. The perceptually seamless transition can in some embodiments be achieved by:

Obtaining acoustic environment extent information from the audio scene metadata in the bitstream;

Obtaining proximity threshold distance for the other AEs in the audio scene metadata in the bitstream;

Determining the listener's current acoustic environment depending on the listener position;

Setting the current acoustic environment late reverb attenuation to zero. Thus rendering the reverb at full gain level;

Determining if the proximity of the listener with the other AEs is within the obtained proximity threshold distance.

For all the AEs within the respective proximity threshold distance, late reverb attenuation is modified (linearly) to the proximity threshold distance for the respective AE. For example, with a proximity threshold distance of 1 m, if the listener is 90 cm from the second AE, the attenuation value for the second AE reverb is set to 90%.

Late reverberation can be rendered for all the AEs according to their respective determined attenuation value;

All the reverbs are subsequently summed up to obtain the resultant late reverberation.

In some embodiments, the proximity threshold is generated as proportional to the difference in one or more of the acoustic environment parameters such as RT60, size of acoustic environment and size of acoustic coupling (e.g. width and height; width, height and length, etc.).

In some embodiments, the variation in the attenuation value when the listener is within the proximity threshold distance to the neighboring acoustically coupled AEs can be varied according to the type defined in the audio scene rendering bitstream. The type of variation can be linear, exponential, etc.

In some further embodiments, the attenuation maximum value is signaled such as it may even be a value less than 100%. This will result in the particular acoustic environment to be omnipresent in the entire audio scene, all the time. Such a parameter can be a simple method to spread the sound of late reverb of a particular AE in the entire scene without the need to specifically incorporate reverb routing via portals. This can be of significant benefit in complex scenes with interlinked acoustic environments (e.g., comprising multiple AEs with acoustic coupling among the AEs).

The acoustic transition information to implement seamless transition with crossfade can be signaled via the bitstream to modify the late reverb transition behavior across AEs. Such a signalling can in some embodiments comprise individual parameters in the bitstream or signaling index of predefined tables.

In some embodiments, the proximity threshold can be an area or volume.

Figure 2:
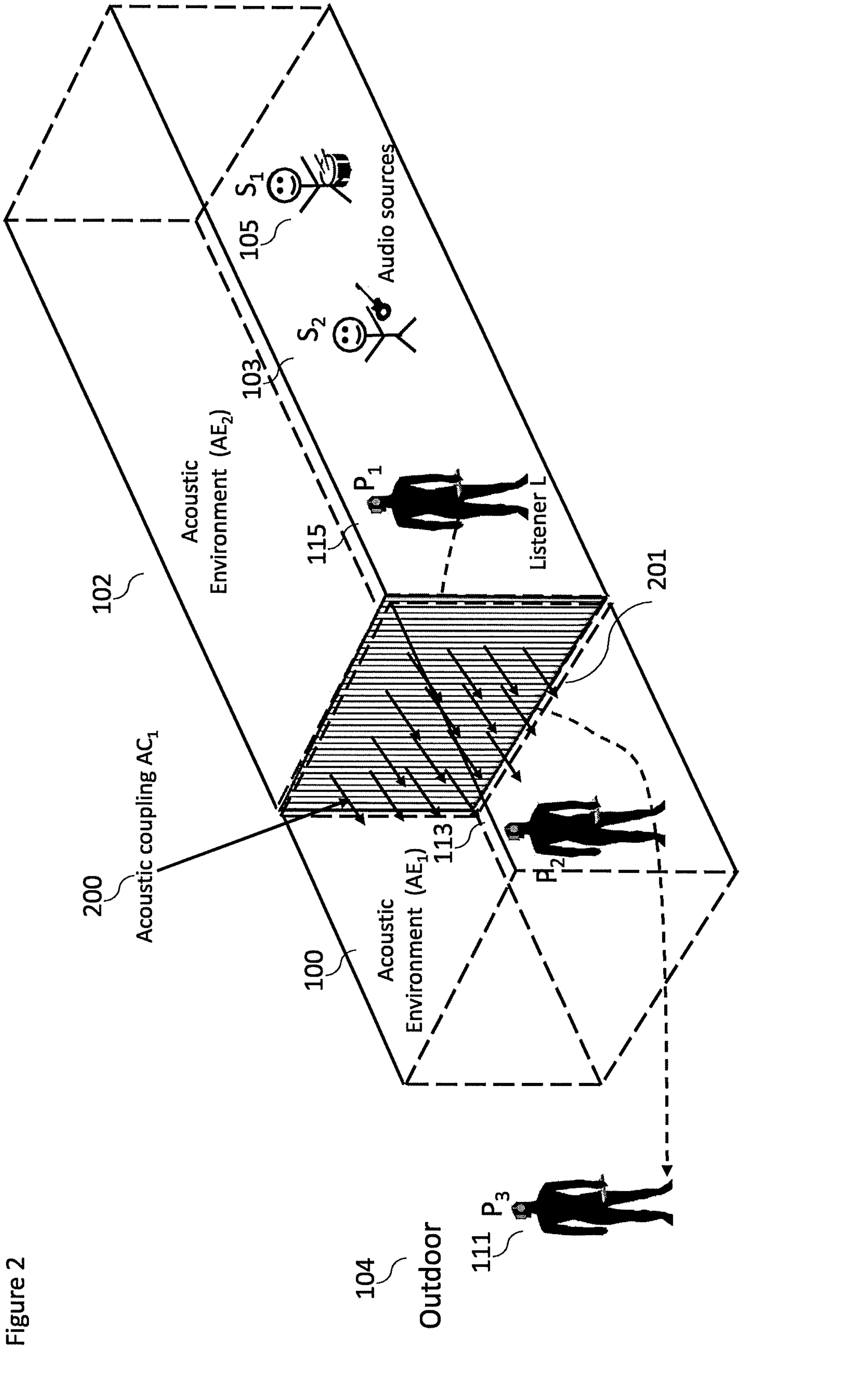
FIG. 2 shows schematically an example of multiple acoustic environments with acoustic coupling between the acoustic environments where within which there can be implemented some embodiments.

With respect to FIGS. 1 and 2 are shown an example audio scene. The audio scene comprises an outdoor 104 region, a first acoustic environment $AE_1$ 100 and a second acoustic environment $AE_2$ 102. The second acoustic environment $AE_2$ 102 is shown with two audio sources, a first audio source $S_1$ 105 and a second audio source $S_2$ 103. Furthermore is shown the listener who is free two move within the audio scene and is shown at a first position $P_1$ 115 within the second acoustic environment $AE_2$ 102, at a second position $P_2$ 113 within the first acoustic environment $AE_1$ 100 and a third position $P_3$ 111 when the listener is outdoors 104.

The difference between audio scene shown in FIGS. 1 and 2 is the presence of a known acoustic coupling $AC_1$ 200 between the first acoustic environment $AE_1$ 100 and the second acoustic environment $AE_2$ 102 which defines the 'free' exchange of audio between the two AEs.

Each acoustic environment is modelled and is configured to reproduce late reverberation according to specified acoustic properties. The acoustic properties comprise parameters such as RT60 and diffuse to direction ratio (DDR). The value of the DDR parameter can be assigned either based on a particular calculation approach or specified as content creator intent.

For example a known method for determining or calculating DDR has been described in clause 3.3 of MPEG-I Immersive Audio CfP Supplemental Information, Recommendations and Clarifications, Version 1, N00083. DDR is also defined in clause 3.9 EIF N00054.

As described above the audio scene is shown comprising two active audio sources $S_1$ 105 and $S_2$ 103. In addition, due to the acoustic coupling $AC_1$ (or opening) that connects the acoustic environments $AE_1$ 100 and $AE_2$ 102, audio energy can travel from $AE_2$ 102 to $AE_1$ 100.

The presence and details of the acoustic coupling information can be obtained or determined based on any suitable method. For example this information can be determined by geometry analysis, shooting a dense set of rays in all directions to identify an opening. However, the methods for determining presence and extent of acoustic coupling is not described in further detail hereafter. In this invention the acoustic couplings through which a listener is expected to transition are more important because such transitions will require special rendering to provide seamless transition between AEs.

As described above it is important to enable seamless transition in late reverberation rendering when the listener transitions between two acoustic environments.

Figure 3:
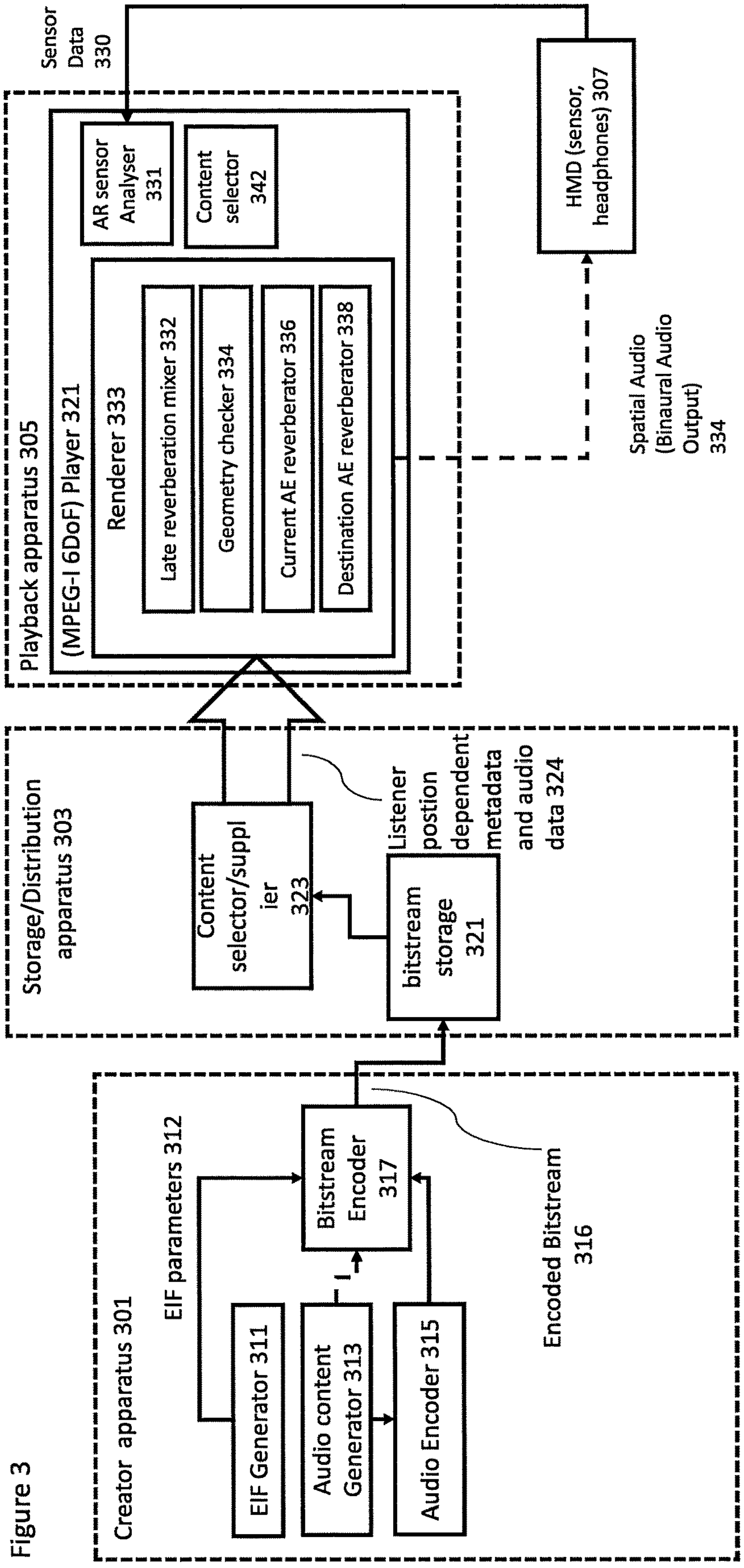
FIG. 3 shows schematically an example system within which some embodiments can be implemented.

With respect to FIGS. 3 and 4 are shown an schematic view of apparatus suitable for implementing some embodiments and a flow diagram of the implementation embodiments. The implementation of the seamless transition late reverberation embodiments thus aim to avoid an abrupt transition which breaks plausibility and consequently immersion in the 6DoF audio scene.

As shown in FIG. 3 is an example creator apparatus 301 configured to obtain the content in the form of virtual scene definition parameters and audio signals and provide a suitable bitstream/data-file comprising the audio signals and virtual scene definition parameters.

In some embodiments as shown in FIG. 3 the creator apparatus 301 comprises an encoder input format (EIF) data generator 311. The encoder input format (EIF) data generator 311 is configured to create EIF (Encoder Input Format) data, which is the content creator scene description. The scene description information contains virtual scene geometry information such as positions of audio elements. Furthermore the scene description information may comprise other associated metadata such as directivity and size and other acoustically relevant elements. For example the associated metadata could comprise positions of virtual walls and their acoustic properties and other acoustically relevant objects such as occluders. An example of acoustic property is acoustic material properties such as (frequency dependent) absorption or reflection coefficients, amount of scattered energy, or transmission properties. In some embodiments, the virtual acoustic environment can be described according to its (frequency dependent) reverberation time or diffuse-to-direct sound ratio. The EIF data generator 311 in some embodiments may be more generally known as a virtual scene information generator. The virtual scene description can in some embodiments comprise a number of acoustic environment descriptions. The virtual scene reverberation parameters in some embodiments are derived based on the reverberation characterization information such as pre-delay, −60 dB reverberation time (RT60) which specifies the time required for an audio signal to decay to 60 dB below the initial level, or Diffuse-to-Direct-Ratio (DDR) which specifies the level of the diffuse reverberation relative to the level of the total emitted sound in each of the acoustic environment descriptions specified in the EIF. RT60 and DDR can be frequency dependent properties. The EIF parameters 312 can in some embodiments be provided to a suitable bitstream encoder 317.

As described in further detail in this application, one of the parameters employed in the late reverberation and seamless late reverb transition bitstream creation is a proximity threshold distance. The proximity threshold distance is one at which the listener is able to hear reverberation from a neighbouring AR. The proximity threshold distance may be derived either programmatically or based on content creator's creative intent.

In some embodiments, the proximity threshold distance may be derived from the following equation:

$$D_{TH}=K_1(RT60_D-RT60_S)+K_2(DDR_D-DDR_S)+K_3\{(V_D-V_S)/V_S\}$$

In the above equation, $D_{TH}$ corresponds to proximity distance threshold for the listener in the current AE (also referred to as source AE) and the neighbourhood AE where the listener is transitioning to (e.g., by walking or teleport) is referred to as destination AE. The $RT60_D$ and RT60s represent the destination and source AE's RT60 values. The DDRD and DDRS values represent the destination and source AE's DDR values. The values $V_D$ and $V_S$ represent the volumes of the destination and source AEs. The constants $K_1$, $K_2$ and $K_3$ can be specified in the encoder depending on the scene data. The above is only one example of deriving the proximity distance. This distance may be derived by the content creator by manual tuning and specified in the encoded bitstream. In other embodiments, the proximity distance may be a renderer implementation choice.

In some embodiments the creator apparatus 301 comprises an audio content generator 313. The audio content generator 313 is configured to generate the audio content corresponding to the audio scene. The audio content generator 313 in some embodiments is configured to generate or otherwise obtain audio signals associated with the virtual scene. For example in some embodiments these audio signals may be obtained or captured using suitable microphones or arrays of microphones, be based on processed captured audio signals or synthesised. In some embodiments the audio content generator 313 is furthermore configured in some embodiments to generate or obtain audio parameters associated with the audio signals such as position within the virtual scene or directivity of the signals. The audio signals and/or parameters 312 can in some embodiments be provided to a suitable audio encoder 315 and bitstream encoder 317.

The creator apparatus 301 may further comprise a suitable audio encoder 315. The audio encoder 315 in some embodiments is configured to use audio signals and generate encoder audio which is passed to the bitstream encoder 317.

The creator apparatus 301 in some embodiments comprises a bitstream encoder 317. The bitstream encoder 317 is configured to receive EIF parameters 312 and encoded audio signals/parameters and based on this information generate a suitable encoded bitstream. This can for example be a MPEG-I 6DoF Audio bitstream. In some embodiments the bitstream encoder 317 can be a dedicated encoding device. The output of the bitstream encoder 317 can be passed to a distribution or storage device 303. The audio signals within the MPEG-I 6DoF audio bitstream can in an embodiment be encoded in the MPEG-H 3D format, which is described in ISO/IEC 23008-3:2018 High efficiency coding and media delivery in heterogenous environments—Part 3: 3D audio. This specification describes suitable coding methods for audio objects, channels, and higher order ambisonics. The low complexity (LC) profile of this specification may be particularly useful for encoding the audio signals.

In some embodiments the bitstream syntax that can be incorporated in the late reverb rendering metadata is the following example:

```
aligned(8) AcousticEnvironmentTransitionStruct( ){
  unsigned int(8) num_AcousticEnvironments; //Neighborhood AEs
  unsigned int(16) current_acousticEnvironment_id; //current AE
identifier for(i=0;i<num_AcousticEnvironments;i++){
    unsigned int(1) renderer_ae_transition_thresholds_flag;
//Neighborhood AEs
    if(!renderer_ae_transition_thresholds_flag){
      unsigned int(16)
destination_acousticEnvironment_id;//neighorhood AEs
      unsigned int(32) proximity_threshold_distance; //in mm
      unsigned int(8) num_hops;//assumes neighorhood AEs
      unsigned int(32) hysteresis_offset; //in mm
      unsigned int(4) attenuation_modulation_type; //one or
more types
      unsigned int(4) attenuation_upperbound_index;
//omnipresent if index greater than 0
    }
  }
}
```

With respect to the AcousticEnvironmentTransitionStruct( ) the num_AcousticEnvironments parameter is configured to provide the number of AEs to which the listener can transit to via an acoustic coupling. The AEs included may not be restricted to only the immediate neighbours but also AEs which are acoustically coupled to the immediate neighbors.

The current_acousticEnvironment_id parameter provides the environment ID of the current AE. This may not be present if the AcousticEnvironmentTransitionStruct( ) is delivered within a LateReverbStruct( ).

The destination_acousticEnvironment_id can be configured of provide the environment ID of the destination AE to which the listener can transit. The transition may occur either by plain walking or by teleportation.

Further the proximity_threshold_distance parameter is configured to identify the distance (in millimeters) for initiating the seamless transition of late reverberations from the neighborhood when the listener is in the proximity of the border between the AEs.

The parameter num_hops can define the number of hops to the destination AE from the current AE. In case of immediate neighbours the hop size is 1. Furthermore the value distance (in millimeters) for initiating the seamless transition of late reverbs from the neighbourhood when the listener is in the proximity of the border between the AEs.

Additionally the parameter hysteresis_offset is the distance (in millimeters) which is added to the proximity_threshold_distance after the listener has at a distance less than the proximity_threshold_distance to the other AEs in the audio scene. This value is added to prevent unnatural behaviour if the user moves back and forth, a tiny amount, at the proximity_threshold_distance boundary. In other embodiments, the hysteresis_offset can be specified as percentage points in the range 1-100.

The attenuation modulation type in some embodiments identifies the method for modifying the attenuation level from 100 to 0 when the listener moves from outside the proximity_threshold_distance to the boundary. The values can for example indicate the type of curve used, linear, exponential, etc.

The parameter attenuation_upperbound_index is the maximum attenuation level. An index value of 0 indicates the maximum attenuation level is 100%. For values of index greater than 1, the maximum attenuation is limited to 95%, 90%, etc.

The above seamless transition data structure can in some embodiments be embedded in the LateReverbStruct( ) in the manner described below:

```
aligned(8) LateReverbStruct( ){
  unsigned int(2) numberOfSpatialPositions;
  bit(6) reserved = 0;
  for (i=0;i<numberOfSpatialPositions;i++){
    signed int(32) azimuth;
    signed int(32) elevation;
  }
  unsigned int(8) numberOfAcousticEnvironments;
  for(m=0;m<numberOfAcousticEnvironments;m++){
    unsigned int(1) ae__late__reverb__transition__struct__present;
    bit(7) reserved = 0;
    unsigned int(16) environmentId;
    filterParamsStruct( );
    for(m=0;m<numberOfSpatialPositions;m++){
      unsigned int(32) delayLineLength;
      filterParamsStruct( );
    }
    if(ae__late__reverb__transition__struct__present){
      AcoustcEnvironmentTransitionStruct( );
    }
  }
}
aligned(8) filterParamsStruct( ){
  SOSLength;
  If(SOSLength>0){
    for (i=0;i<SOSLength;i++){
      signed int(32) b1;
    }
    for (i=0;i<SOSLength; i++){
      signed int(32) b2;
    }
    for (i=0;i<SOSLength;i++){
```

-continued

```
      signed int(32) a1;
    }
    for (i=0;i<SOSLength;i++){
      signed int(32) a2;
    }
  signed int(32) globalGain;
  signed int(32) levelDb;
  }
}
```

In some embodiments for the structure of LateReverbStruct( ) the parameter numberOfSpatialPositions defines the number of delay line positions for the late reverb payload. This value is defined using an index which corresponds to a specific number of delay lines. The value of the bit string ' 0b00' signals the renderer to a value of 15 spatial orientations for delay lines. The other three values '0b01', '0b10' and '0b11' are reserved.

In some embodiments the azimuth parameter defines azimuth of the delay line with respect to the listener. The range is between −180 to 180 degrees.

The parameter elevation can identify the elevation defines the elevation of the delay line with respect to the listener. The range is between −90 to 90 degrees.

The parameter numberOfAcousticEnvironments defines the number of acoustic environments in the audio scene. The LateReverbStruct( ) in some embodiments carries information regarding the one or more acoustic environments which are present in the audio scene at that time.

Further the parameter environmentId defines the unique identifier of the acoustic environment.

The delayLineLength value defines the length in units of samples for the graphic equalizer (GEQ) filter used for configuration of the attenuation filter. The lengths of different delay lines corresponding to the same acoustic environment are mutually prime.

The structure filterParamsStruct( ) can in some embodiments describe the graphic equalizer cascade filter to configure the attenuation filter for the delay lines. The same structure is also used subsequently to configure the filter for diffuse-to-direct reverberation ratio.

The filterParamsStruct( ) SOSLength parameter is the length each of the second order section filter coefficients. The values of b1, b2, a1, a2 are the filter coefficients b1, b2, a1 and a2. Further the globalGain parameter can specify the gain factor in decibels for the GEQ.

The levelDB value specifies the sound level for each of the delay lines in decibels.

In another implementation embodiment the parameters fadeInDistance and seamless transition enabled flags may be present in the renderer settings. In other embodiments these may be included in the bitstream as follows:

```
aligned(8) AcousticEnvironmentTransitionStructAlternative( ){
  unsigned int(8) num__AcousticEnvironments; //Neighborhood AEs
  unsigned int(16) current__acousticEnvironment__id; //current AE
identifier for(i=0;i<num__AcousticEnvironments;i++){
    unsigned int(1) fadeInDistance__present;
    if(fadeInDistance__present){
      unsigned int(16)
```

-continued

```
destination_acousticEnvironment_id;//neighorhood AEs
        unsigned int(32) fadeInDistance; //in mm
        unsigned int(1) fadeInEnabled;//flag to (dis)enable
fadeInDistance
      }
    }
  }
```

fadeInDistance is the proximity distance threshold to enable crossfade and the enabled field is the flag to enable/disable this crossfade feature for a given AE.

Figure 4A:
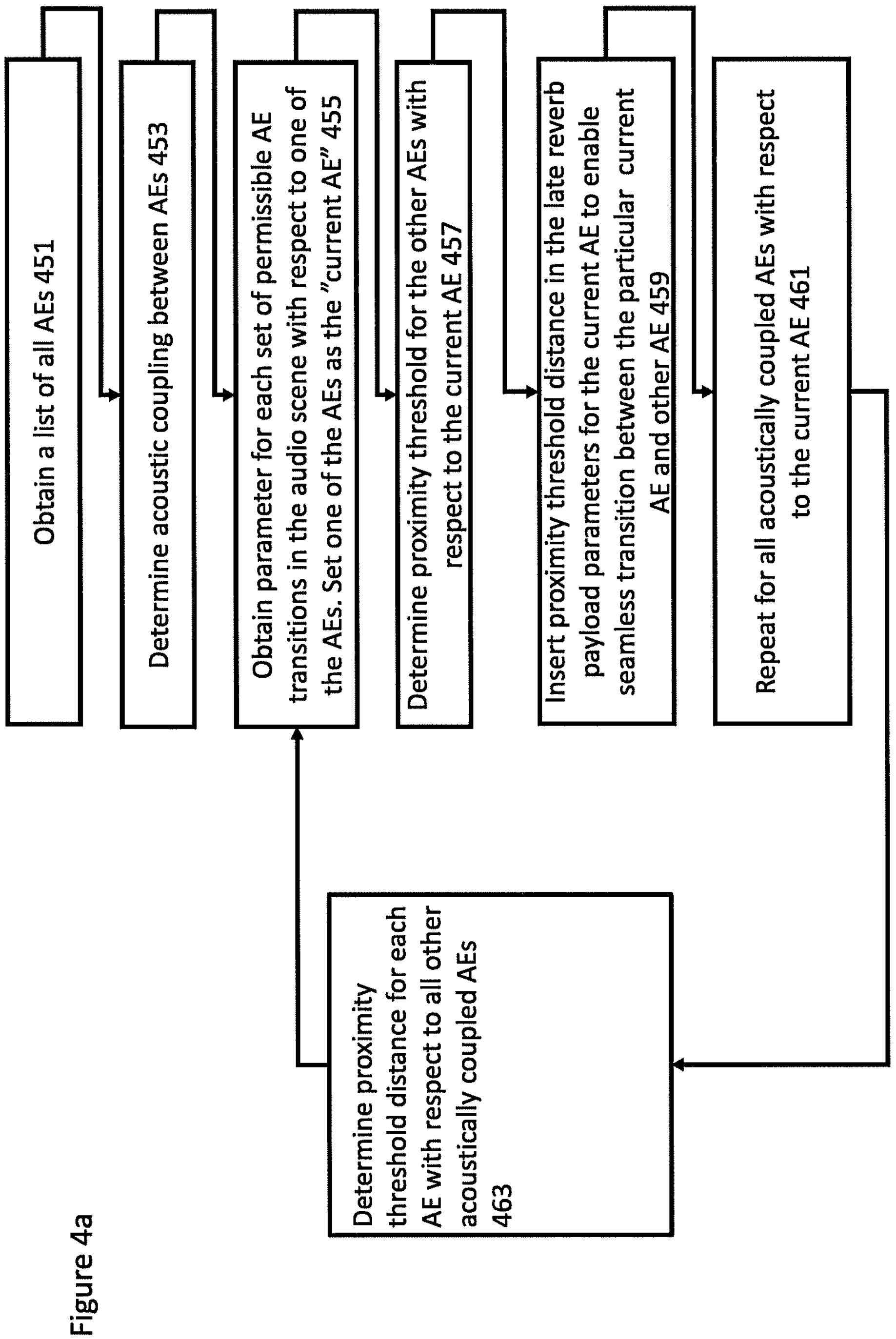
FIGS. 4*a* and 4*b* show flow diagrams of the operation of the example system of apparatus as shown in FIG. 3 according to some embodiments.

The method of selecting or generating the AE parameters can be show with respect to the flow diagram of FIG. 4*a*.

Thus for example there is obtained the list of all AEs as shown in FIG. 4*a* by step 451.

Then the acoustic couplings between the AEs are determined/obtained or received as shown in FIG. 4*a* by step 453.

Then the parameters for each set of permissible AE transitions in the audio scene with respect to one of the AEs are obtained (furthermore in some embodiments one of the AEs is set as the "current AE") as shown in FIG. 4*a* by step 455.

A proximity threshold is determined for the other AEs with respect to the current AE as shown in FIG. 4*a* by step 457.

Then the proximity threshold distances are inserted in the late reverb payload parameters for the current AE to enable seamless transition between the particular current AE and other AE as shown in FIG. 4*a* by step 459.

Then the approach is repeated for all acoustically coupled AEs with respect to the current AE is shown in FIG. 4*a* by step 461.

In the repeat loop then the proximity threshold distance is determined for each AE with respect to all other acoustically coupled AEs as shown in FIG. 4*a* by step 463.

Furthermore the system of apparatus shown in FIG. 3 comprises (an optional) storage/distribution apparatus 303. The storage/distribution apparatus 303 is configured to obtain, from the creator apparatus 301, the encoded bitstream 316 (comprising parameters and audio signals) and store and/or distribute these to a suitable playback apparatus 305. In some embodiments the functionality of the storage/distribution apparatus 303 is integrated within the creator apparatus 301.

In some embodiments the bitstream is distributed over a network with any desired delivery format. Example delivery formats which may be employed in some embodiments can be done with any suitable approach such as DASH (Dynamic Adaptive Streaming over HTTP), CMAF (Common Media Application Format), HLS (HTP live streaming), etc.

In some embodiments, not described in further detail in this example, the audio signals are transmitted in a separate data stream to the encoded parameters. In some embodiments the storage/distribution apparatus 303 comprises a bitstream storage 321 configured to obtain and store the encoded audio and parameters.

Furthermore in some embodiments the storage/distribution apparatus 303 comprises a content selector/supplier 323 configured to distribute the encoded bitstream (encoded audio and parameters). In some embodiments the content selector/supplier is, as shown in FIG. 3, configured to supply metadata in the form of the encoded parameters and the audio data 324 based on listener position information.

The system of apparatus as shown in FIG. 3 further comprises a playback apparatus 305. The playback apparatus 305 is configured to obtain, from the storage/distribution apparatus 303 the encoded parameters and encoded audio signals (based on the listener position) 324. Additionally in some embodiments the playback apparatus 305 is configured to obtain sensor data 330 (associated with the physical listening space) and configured to generate a suitable rendered audio signal or signals 334 which are provided the user, for example, as shown in FIG. 3 a head mounted device HMD 307 (which can in some embodiments comprise a sensor and headphones). The sensor can for example determine the physical space in which the listener is located or the position and/or orientation of the listener).

The playback apparatus 305 in some embodiments comprises a (MPEG-I 6DoF) player 321 configured to receive the bitstream 324 (comprising the parameters and audio data). The player 321 in some embodiments may in case of AR rendering the device is also expected to be equipped with AR sensing module to obtain the listening space physical properties.

The 6DoF bitstream (comprising the parameters and the audio signals) alone is sufficient to perform rendering in VR scenarios. That is, in VR scenarios the necessary acoustic information is carried in the bitstream and is sufficient for rendering the audio scene at different virtual positions in the scene, according to the virtual acoustic properties such as materials and reverberation parameters.

For AR scenarios, the renderer can obtain the listener space information using the AR sensing provided to the renderer for example in a LSDF format, during rendering. This provides information such as the listener physical space reflecting elements (such as walls, curtains, windows, opening between the rooms, etc.).

Thus for example in some embodiments the user or listener is operating (or wearing) a suitable head mounted device (HMD) 207. The HMD may be equipped with sensors configured to generate suitable sensor data 330 which can be passed to the playback apparatus 305.

The playback apparatus 305 (and the MPEG-I 6DoF player 321) furthermore in some embodiments comprises an AR sensor analyser 331. The AR sensor analyser 331 is configured to generate (from the HMD sensed data or otherwise) the physical space information. This can for example be in a LSDF parameter format and the relevant LSDF parameters passed to a suitable renderer 333.

The playback apparatus 305 (and the MPEG-I 6DoF player 321) in some embodiments further comprises a content selector 342. The content selector 342 in some embodiments is configured to obtain the listener position and/or orientation and pass this information to the content selector/supplier 323 in order for the content selector/supplier 323 is able to provide the audio and parameters based on the listener position.

The playback apparatus 305 (and the MPEG-I 6DoF player 321) furthermore in some embodiments comprises a renderer 333 configured to receive the virtual space parameters, the audio signals (and in some embodiments the physical listening space parameters) and generate suitable spatial audio signals which as shown in FIG. 3 which are output to the HMD 307, for example as binaural audio signals to be output by headphones.

In some embodiments the renderer 333 comprises a geometry checker 334. The geometry checker 334 in some embodiments is configured to determine or obtain the listener position and furthermore based on the listener position configured to check whether the listener position locates the listener in one of the acoustic environments and if so which acoustic environment. This acoustic environment can be determined as the current AE.

The geometry checker 334 can further be configured to perform a geometric check to determine whether the listener position is within the proximity of the neighbourhood AE based on the listener position and the proximity threshold(s) is obtained from the received late reverb rendering metadata in the 6DoF rendering bistream.

In some embodiments the renderer 333 comprises a current AE reverberator 336. The current AE reverberator 336 is the reverberator associated with the current AE and can be implemented according to any suitable manner. For example in some embodiments the reverberator 336 is implemented as a delay line with variable gain feedback loops or variable gain feedforward loops.

In some embodiments the renderer 333 comprises a destination AE reverberator 338. The destination AE reverberator 338 is the reverberator associated with the destination AE and can be implemented according to any suitable manner. For example in some embodiments the reverberator 338 is implemented as a delay line with variable gain feedback loops or variable gain feedforward loops. In some embodiments, there can be other AEs contributing to the current and destination reverberators. Such AEs are considered implicity to be included in the rendering for current and destination AE late reverb rendering.

In some embodiments the renderer 333 comprises a late reverberation mixer 332. The late reverberation mixer is configured to obtain the output the outputs from the late reverberators from the current and destination later renderers and combine them to generate a combined rendering output.

Thus in general the seamless transition is implemented in the following manner:

1. If the listener is found to be within an specific AE extent boundary, it is set to be within that AE. For example, the listener is set to be within $AE_1$ if the listener is within the boundary of $AE_1$, for a scene comprising $AE_1$ and $AE_2$ acoustic environments.
2. Subsequently, if the renderer notices that the listener is within $AE_1$ but further away from the proximity threshold distance to $AE_2$, $AE_1$ attenuation is set to 0 and $AE_2$ attenuation is set to 100 for the seamless transition handling. This is because the listener is quite far from the transition zone.
3. Subsequently, if the listener moves towards $AE_2$ such that the listener position is less than proximity threshold distance to $AE_2$ but the listener continues to be within $AE_1$, a seamless transition mechanism is enabled which will result in rendering $AE_1$ with attenuation 0 and $AE_2$ with attenuation depending on the proximity to $AE_2$ (which is less than proximity threshold distance).
4. Such seamless transition rendering of late reverb with a sum of late reverb from $AE_1$ with attenuation 0 and late reverb from $AE_2$ with attenuation less than 100 but greater than 0 will be rendered. This will continue until the listener moves to the boundary between $AE_1$ and $AE_2$. At this point attenuation will be 0 for $AE_1$ as well as $AE_2$.

Figure 4B:
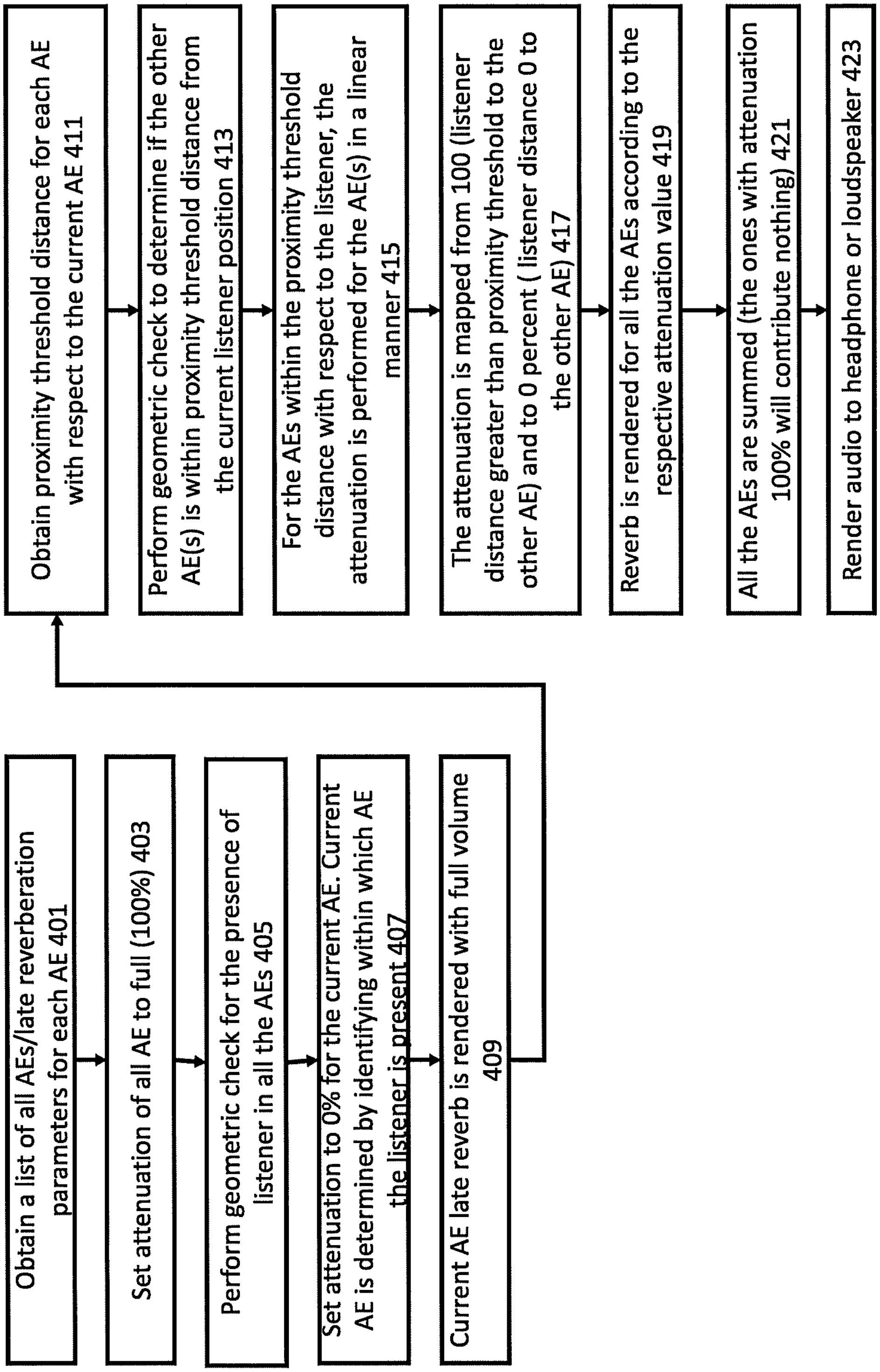

The operations performed in the renderer with respect to some embodiments (which further detail the implementation above) are shown in the flow diagram of FIG. 4*b*.

Thus information about all the AEs in the audio scene are obtained as shown in FIG. 4*b* by step 401. In some embodiments this information is obtained in the form of 6DoF metadata in the bitstream corresponding to the currently consumed 6DoF audio scene. The information thus comprises information for one or more AEs in the audio scene. In some embodiments the audio scene comprises two or more AEs. Furthermore, in some embodiments the audio scene further comprises an acoustic coupling between the AEs through which the listener can transition across acoustic environments. Furthermore the late reverberation rendering parameters are obtained for the one or more AEs in the audio scene.

All the attenuation levels for all the AEs in the audio scene are set to full or 100%. In other words, all the late reverb rendering for all the AEs is set to produce no sound as shown in FIG. 4*b* by step 403.

Then a geometric check is performed based on the current position of the listener in the audio scene to identify the AE where the listener is present as shown in FIG. 4*b* by step 405.

For the AE where the listener is determined to be present, the attenuation level is set to 0 as shown in FIG. 4*b* by step 407.

Consequently, the current AE late reverberation is set to full volume as shown in FIG. 4*b* by step 409.

In the next step, the renderer can be configured to obtain or retrieve a listener proximity threshold for each of the other AEs (e.g., neighbourhood AEs) which are determined to allow a listener to transition through the AE boundaries during the scene consumption. The obtaining of the proximity threshold is shown in FIG. 4*b* by step 411.

Figure 5:
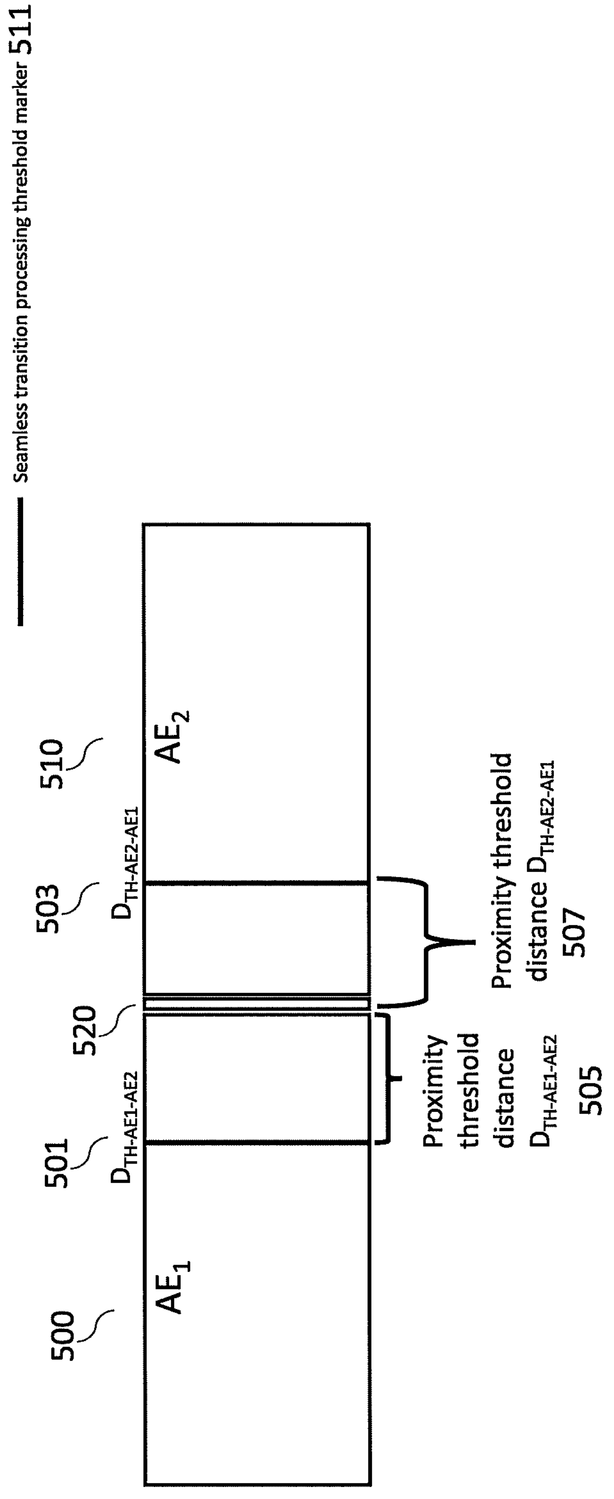
FIG. 5 shows schematically a proximity threshold enabling a seamless acoustic environment transition processing of late reverberation for a neighbouring acoustic environment.

An example of the proximity threshold is shown in FIG. 5. In this example the first and second acoustic environments are shown as $AE_1$ 500 and $AE_2$ 510. Between the acoustic environments is the acoustic coupling 520. Furthermore is shown the proximity threshold $D_{TH\text{-}AE1\text{-}AE2}$ 501 within $AE_1$ and associated with $AE_2$. The proximity threshold $D_{TH\text{-}AE1\text{-}AE2}$ 501 is located at a distance 505 from the acoustic coupling 520 within the $AR_1$. Furthermore there is shown a proximity threshold $D_{TH\text{-}AE2\text{-}AE1}$ 503 within $AE_2$ and associated with $AE_1$. The proximity threshold $D_{TH\text{-}AE2\text{-}AE1}$ 503 is located at a further distance 507 from the acoustic coupling 520 within the $AE_2$ 510. The proximity thresholds define a seamless transition processing threshold marker 511.

A further geometric check is performed, as shown in FIG. 4 by step 413, for the proximity of the neighbourhood AE with respect to the listener where the proximity threshold is obtained from the received late reverb rendering metadata in the 6DoF rendering bistream.

Where at least one neighbouring AE is determined based on the geometric check determining (a proximity to) the neighbourhood AE then a neighbourhood AE within the threshold proximity distance is rendered with late reverberation attenuation. The attenuation in some embodiments is modulated or modified according to the listener proximity to the neighbourhood AE.

In some embodiments the attenuation modulation or modification is performed linearly such that if the listener distance is greater than the proximity threshold to the other AE, the attenuation is set to 100. On the other hand, if the listener is at 0 distance from the other AE, the attenuation is set to 0.

This initial linear setting is shown in FIG. 4*b* by step 415.

The variation between the 0 and 100 can be controlled based on any suitable mapping or function. Furthermore in some embodiments this mapping or function is determined based on a parameter delivered from the bitstream, which specifies if the variation is linear, exponential, etc. The modification or mapping function applied to the gain value is shown in FIG. 4*b* by step 417.

Figure 6:
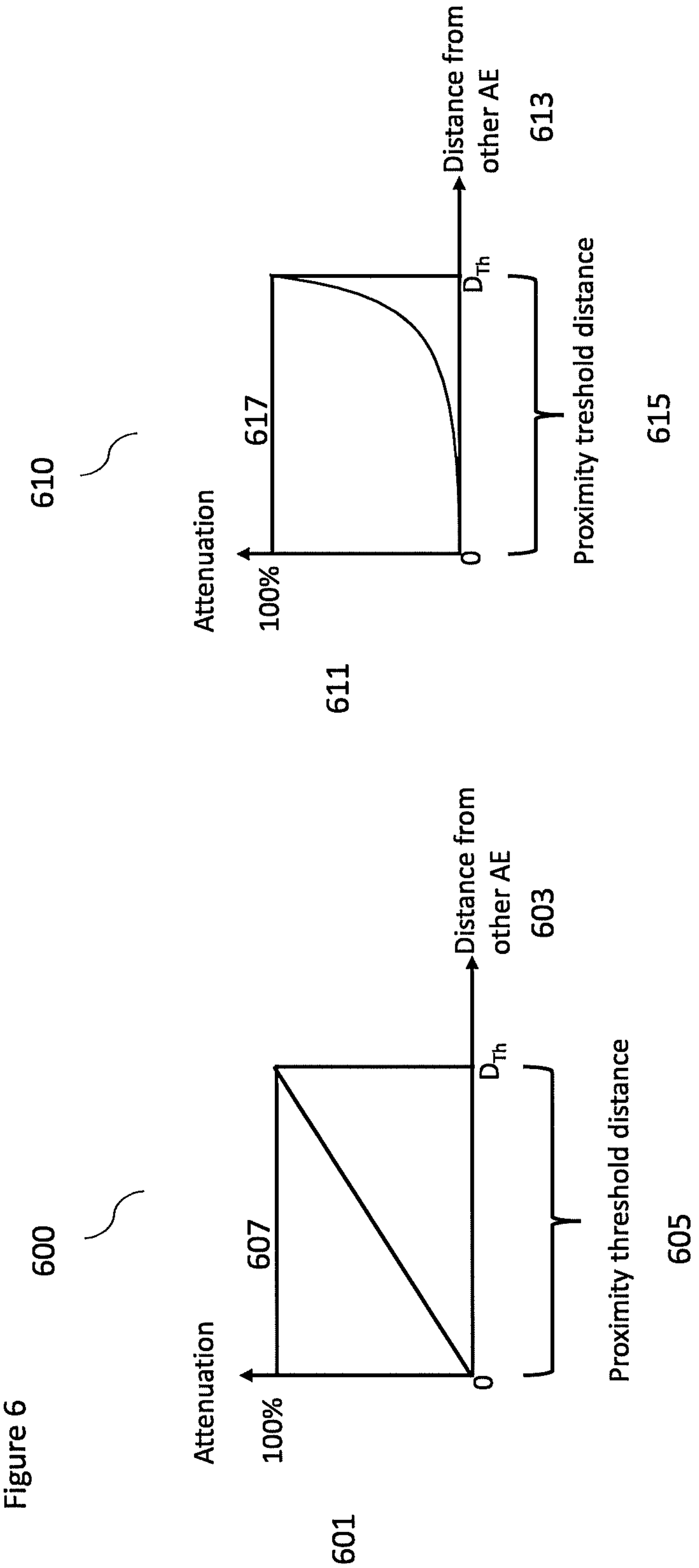
FIG. 6 shows example mappings between the proximity threshold distance to the change in attenuation of late reverb for the neighbouring acoustic environment when the listener is less than proximity threshold distance away from the border between the acoustic environments.

With resect to FIG. 6 is shown the example linear mapping 600 and non-linear mapping 610. Thus as shown with respect to the linear mapping 607 example the attenuation

601 from 0% to 100% changes from a distance of 0 to proximity threshold distance 605 from the other AE 603. Also is shown the example non-linear (or exponential) mapping 617 where the attenuation 611 from 0% to 100% changes from a distance of 0 to proximity threshold distance 615 from the other AE 613.

Then having set the gains the AEs are rendered with according to the respective attenuation values as shown in FIG. 4*b* by step 419.

Having generated the reverberation rendering parts all the AEs parts are summed up as shown in FIG. 4*b* by step 421.

The renders are then output as shown in FIG. 4*b* by step 423.

Figure 7:
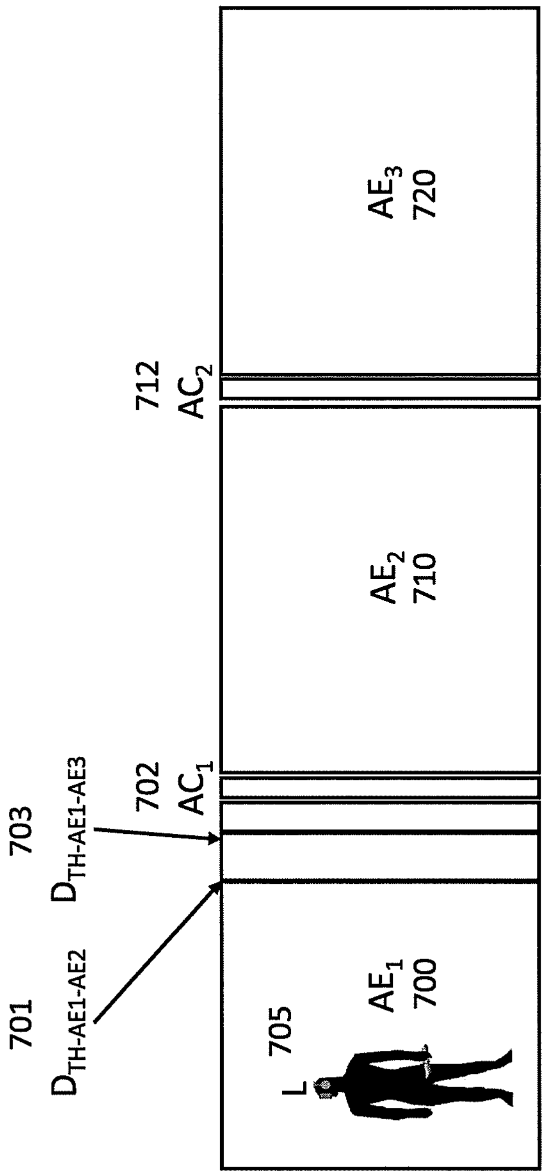
FIGS. 7 and 8 show example multiple acoustic environments where there may be rendered with certain attenuations depending on the proximity distance.

It should be noted, that in case of more than 2 AEs in the audio scene, there can be acoustic coupling between multiple AEs. For example as shown in FIG. 7 there is shown a first, second and third acoustic environments $AE_1$ 700, $AE_2$ 710 and $AE_3$ 720 where a there is a first acoustic coupling $AC_1$ 702 between $AE_1$ 700 and $AE_2$ 710 and a second acoustic coupling $AC_2$ 712 between $AE_2$ 710 and $AE_3$ 720. Furthermore is shown a first proximity threshold $D_{TH\text{-}AE1\text{-}AE2}$ 701 within AES 700 and associated with $AE_2$ and a second proximity threshold $D_{TH\text{-}AE1\text{-}AE3}$ 703 located also within $AE_1$ 700 and associated with $AE_3$.

In such a case, the proximity thresholds apply for listener L 705 in $AE_1$ 700 corresponding to $AE_2$ 710 and $AE_3$ 720. One difference with respect to the earlier example is that the attenuation level for $AE_3$ will not reach to 0 during transition from $AE_1$ to $AE_2$, this is because $AE_3$ attenuation level for late reverberation will reach 0 when the listener is at the boundary between $AE_2$ and $AE_3$. The benefit of this approach is that there is no need to feed $AE_3$ to $AE_2$ and then mix $AE_2$ to $AE_1$.

Such embodiments thus reduce an overall proceeding delay induced by feeding cascade coupled AEs before performing late reverb rendering output.

Figure 8:
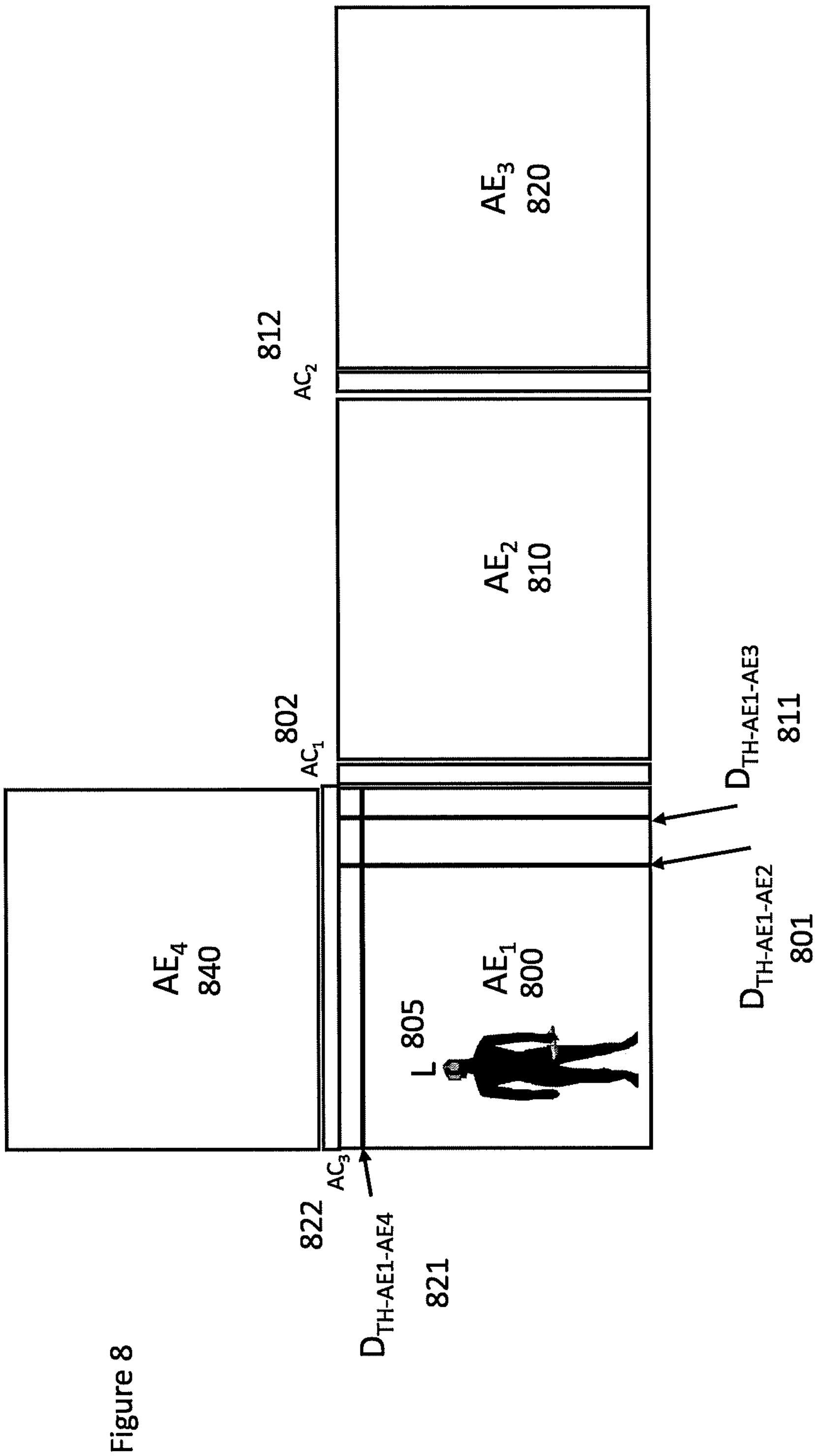

Furthermore, this approach can be applied for other geometries as shown in FIG. 8, for an audio scene comprising 4 AEs. In this example there is shown a first, second, third and fourth acoustic environments $AE_1$ 800, $AE_2$ 810, $AE_3$ 820 and $AE_4$ 830 where a there is a first acoustic coupling $AC_1$ 802 between $AE_1$ 800 and $AE_2$ 810, a second acoustic coupling $AC_2$ 812 between $AE_2$ 810 and $AE_3$ 820 and a third acoustic coupling $AC_3$ 822 between $AE_1$ 800 and $AE_4$ 830. Furthermore is shown a first proximity threshold $D_{TH\text{-}AE1\text{-}AE2}$ 801 within $AE_1$ 800 and associated with $AE_2$, a second proximity threshold $D_{TH\text{-}AE1\text{-}AE3}$ 811 located also within $AE_1$ 800 and associated with $AE_3$ and a third proximity threshold $D_{TH\text{-}AE1\text{-}AE4}$ 821 located also within $AE_1$ 800 and associated with $AE_3$.

In such a case, the geometry check is configured to identify the listener movement towards the relevant transition. For example, a transition $AE_1 \rightarrow AE_2$ compared to $AE_1 \rightarrow AE_4$ will result in different selection of attenuation filters.

Thus, in some embodiments where the geometry check is configured to determine a transition from $AE_1 \rightarrow AE_2$ transition, $AE_3$ may also be rendered during proximity of listener to $AE_2$ to enable seamless transition from $AE_1$ to $AE_2$ in addition to $AE_2$. However, this requires that the proximity threshold distance for $AE_3$ extends to listener position within $AE_1$.

Similarly, in some embodiments where the listener transition from $AE_1 \rightarrow AE_4$, only $AE_4$ is rendered to enable seamless transition within the proximity threshold distance to $AE_4$.

In some embodiments, the proximity distance threshold can be implemented as a proximity region (where the region can be specified by an area or volume). The area or volume can be primitives. In some implementation embodiments, the proximity volume can also be specified by a mesh.

Furthermore, as discussed herein there is apparatus and possible mechanisms providing a practical rendering for immersive audio within AR applications.

The embodiments as described herein combine listening space properties and virtual scene rendering parameters to obtain a fused rendering which provides appropriate audio performance irrespective of the scene properties.

The fusion (or combination) as described in some embodiments is implemented such that the auralization is agnostic or unaware of whether the rendering is for AR or VR. In other words, the embodiments as described herein may be implemented within a system suitable for performing AR, VR (and mixed reality (MR)). Such a mechanism allows AR rendering to be deployable with many different auralization implementations.

In some embodiments the apparatus and possible mechanisms as described herein may be implemented within a system with 6-degrees-of-freedom (i.e., the listener or listening position can move within the scene and the listener position is tracked) binaural rendering of audio.

In such embodiments there is proposed apparatus and methods that use information from the audio scene specified in the bitstream comprising a virtual scene description and a description of the listener's physical space obtained during rendering to obtain a unified scene representation which enables auralization which is agnostic to the virtual and physical space and delivers high quality immersion within the physical space.

Figure 9:
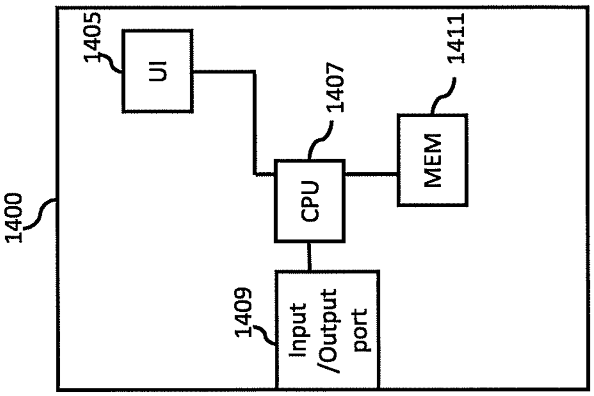
FIG. 9 shows schematically an example device suitable for implementing the apparatus shown.

With respect to FIG. 9 an example electronic device which may represent any of the apparatus shown above (for example computer 1 511, computer 2 521 or computer 3 531). The device may be any suitable electronics device or apparatus. For example in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware.

The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus for enabling audio transition between at least two acoustic environments, the apparatus comprising:

at least one processor; and at least one memory storing instructions that, when executed with the at least one processor, cause the apparatus to:

obtain information of at least a first acoustic environment associated with an audio scene, wherein the audio scene comprises the first acoustic environment and a second acoustic environment;

obtain a first distance threshold that at least partially defines an audio transition region that enables adaptive rendering between the first and second acoustic environments depending on a listening position within the audio scene;

determine the listening position to adjust an environment characteristic of the second acoustic environment, wherein the determined listening position is located within the first acoustic environment and the audio transition region, wherein the determined listening position is located outside the second acoustic environment; and adjust the environment characteristic of the second acoustic environment depending on the listening position for application to audio associated with the second acoustic environment, wherein the environment characteristic is adaptively controlled within the audio scene, wherein a first environment characteristic of the first acoustic environment is maintained.

2. The apparatus as claimed in claimed in claim 1, wherein obtaining the information of at least the first acoustic environment comprises the instructions, when executed with the at least one processor, cause the apparatus to:

receive a bitstream comprising the information of at least the first acoustic environment.

3. The apparatus as claimed in claim 2, wherein the bitstream further comprises the first distance threshold, wherein the instructions, when executed with the at least one processor, cause the apparatus to obtain the first distance threshold from the bitstream.

4. The apparatus as claimed in claim 1, wherein the first acoustic environment and the second acoustic environment are coupled by a first acoustic coupling located at a boundary between the first acoustic environment and the second acoustic environment.

5. The apparatus as claimed in claim 1, wherein the first distance threshold that at least partially defines the audio transition region is located within the first acoustic environment and associated with the second acoustic environment, wherein the first distance threshold comprises a distance outside the second acoustic environment from which the environment characteristic of the second acoustic environment is perceptible.

6. The apparatus as claimed in claim 1, wherein adjusting the environment characteristic of the second acoustic environment comprises the instructions, when executed with the at least one processor, cause the apparatus to:

adjust a reverberation gain of the second acoustic environment based on the listening position relative to the first distance threshold and a boundary between the first acoustic environment and the second acoustic environment.

7. The apparatus as claimed in claim 1, wherein the instructions, when executed with the at least one processor, cause the apparatus to:

obtain a first function associated with the first distance threshold;

wherein adjusting the environment characteristic of the second acoustic environment depending on the listening position comprises the instructions, when executed with the at least one processor, cause the apparatus to:

adjust a reverberation gain of the second acoustic environment further based on the first function applied to the listening position relative to the first distance threshold and a boundary between the first acoustic environment and the second acoustic environment.

8. The apparatus as claimed in claim 1, wherein the instructions, when executed with the at least one processor, cause the apparatus to render a spatial audio signal, wherein the spatial audio signal comprises at least in part a reverberation generated based on the environment characteristic of the second acoustic environment.

9. The apparatus as claimed in claim 8, wherein the instructions, when executed with the at least one processor, cause the apparatus to:

render the spatial audio signal to generate the spatial audio signal comprising a first reverberation part based on a first reverberation gain of the first acoustic environment and/or a second reverberation part based on a second reverberation gain of the second acoustic environment.

10. The apparatus as claimed in claim 9, wherein the instructions, when executed with the at least one processor, cause the apparatus to:

generate the spatial audio signal comprising the first reverberation part based on the first reverberation gain of the first acoustic environment and/or the second reverberation part based on the second reverberation gain of the second acoustic environment to:

set a current acoustic environment as the first acoustic environment when the listening position is within the first acoustic environment;

set reverberation attenuation for all other acoustic environments aside from the first acoustic environment to provide no contribution;

set reverberation attenuation to provide a defined contribution for the second acoustic environment where the listening position is within the audio transition region within the first acoustic environment defined by the first distance threshold;

determine reverberation contributions for the current acoustic environment and the other acoustic environments; and combine the reverberation contributions to form part of the spatial audio signal.

11. The apparatus as claimed in claim 10, wherein the instructions, when executed with the at least one processor, cause the apparatus to:

set the reverberation attenuation to provide the defined contribution for the second acoustic environment where the listening position is within the audio transition region within the first acoustic environment defined by the first distance threshold to set the reverberation attenuation to provide the defined contribution for the second acoustic environment based on a first function.

12. The apparatus as claimed in claim 1, wherein the instructions, when executed with the at least one processor, cause the apparatus to:

obtain the first distance threshold to obtain at least one of:

information indicating how many acoustic environments the first distance threshold is applicable to;

information indicating to which acoustic environments the first distance threshold is applicable to;

information indicating in which acoustic environment the first distance threshold is located;

information indicating a distance value for the first distance threshold;

information indicating a shape or profile associated with the first distance threshold;

information indicating a hysteresis offset value which defines a hysteresis region;

information indicating an attenuation modulation type which defines a function for modifying an attenuation level when the listening position moves from outside the first distance threshold to a boundary between the first and second acoustic environments;

information indicating a hop which defines a number of hops to a destination acoustic environment from a current acoustic environment; or information indicating an attenuation upperbound limit which defines a maximum attenuation level.

13. The apparatus as claimed in claim 12, wherein the instructions, when executed with the at least one processor, cause the apparatus to:

obtain a first function associated with the first distance threshold, wherein the first function defines an adjustment of the environment characteristic of the second acoustic environment.

14. An apparatus for generating acoustic environment information to assist rendering an audio scene, the apparatus comprising:

at least one processor; and at least one memory storing instructions that, when executed with the at least one processor, cause the apparatus to:

obtain information of at least a first acoustic environment associated with the audio scene, wherein the audio scene comprises the first acoustic environment and a second acoustic environment;

obtain a first distance threshold that at least partially defines an audio transition region that enables adaptive rendering between the first and second acoustic environments depending on a listening position within the audio scene, wherein adjustment of an environment characteristic of the second acoustic environment is enabled based on the first distance threshold, for application to audio associated with the second acoustic environment, in response to the listening position being located within the first acoustic environment and the audio transition region and the listening position being located outside the second acoustic environment, wherein a first environment characteristic of the first acoustic environment is enabled to be maintained; and encode and output the information and the first distance threshold.

15. The apparatus as claimed in claim 13, wherein the instructions, when executed with the at least one processor, cause the apparatus to:

obtain the first distance threshold to obtain at least one of:

information indicating how many acoustic environments the first distance threshold is applicable to;

information indicating to which acoustic environments the first distance threshold is applicable to;

information indicating in which acoustic environment the first distance threshold is located;

information indicating a distance value for the first distance threshold;

information indicating a shape or profile associated with the first distance threshold;

information indicating a hysteresis offset value which defines a hysteresis region;

information indicating an attenuation modulation type which defines a function for modifying an attenuation level when the listening position moves from outside the first distance threshold to a boundary between the first and second acoustic environments;

information indicating a hop which defines a number of hops to a destination acoustic environment from a current acoustic environment; or information indicating an attenuation upperbound limit which defines a maximum attenuation level.

16. The apparatus as claimed in claim 14, wherein the instructions, when executed with the at least one processor, cause the apparatus to encode and output the information to generate a bitstream comprising an encoded information and the first distance threshold.

17. The apparatus as claimed in claim 16, wherein the instructions, when executed with the at least one processor, cause the apparatus to obtain at least one audio signal associated with the audio scene, and wherein the instructions, when executed with the at least one processor, cause the apparatus to encode and output the information to generate the bitstream comprising an encoded at least one audio signal.

18. A method for an apparatus for enabling audio transition between at least two acoustic environments, the method comprising:

obtaining information of at least a first acoustic environment associated with an audio scene, wherein the audio scene acoustic comprises the first environment and a second acoustic environment;

obtaining a first distance threshold that at least partially defines an audio transition region that enables adaptive rendering between the first and second acoustic environments depending on a listening position within the audio scene;

determining the listening position to adjust an environment characteristic of the second acoustic environment, wherein the determined listening position is located within the first acoustic environment and the audio transition region, wherein the determined listening position is located outside the second acoustic environment; and adjusting the environment characteristic of the second acoustic environment depending on the listening position for application to audio associated with the second acoustic environment, wherein the environment characteristic is adaptively controlled within the audio scene, wherein a first environment characteristic of the first acoustic environment is maintained.

19. A method as claimed in claim 18, wherein the obtaining of the information of at least the first acoustic environment associated with the audio scene comprises:

receiving a bitstream comprising the information of at least the first acoustic environment associated with the audio scene.

20. A method for an apparatus for generating acoustic environment information to assist rendering an audio scene, the method comprising:

obtaining information of at least a first acoustic environment associated with the audio scene, wherein the audio scene comprises the first acoustic environment and a second acoustic environment;

obtaining a first distance threshold that at least partially defines an audio transition region that enables adaptive rendering between the first and second acoustic environments depending on a listening position within the audio scene, wherein adjustment of an environment characteristic of the second acoustic environment is enabled based on the first distance threshold, for application to audio associated with the second acoustic environment, in response to the listening position being located within the first acoustic environment and the audio transition region and the listening position being located outside the second acoustic environment, wherein a first environment characteristic of the first acoustic environment is enabled to be maintained; and encoding and outputting the information and the first distance threshold.

* * * * *